March 2, 1954     C. J. SIMONSON ET AL     2,670,970
TOY VEHICLE WITH SUBFRAME TRACTION WHEEL
Filed Aug. 10, 1951
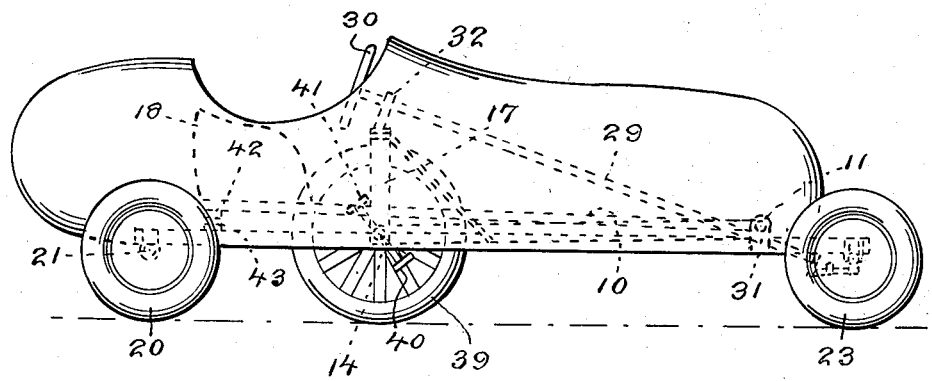
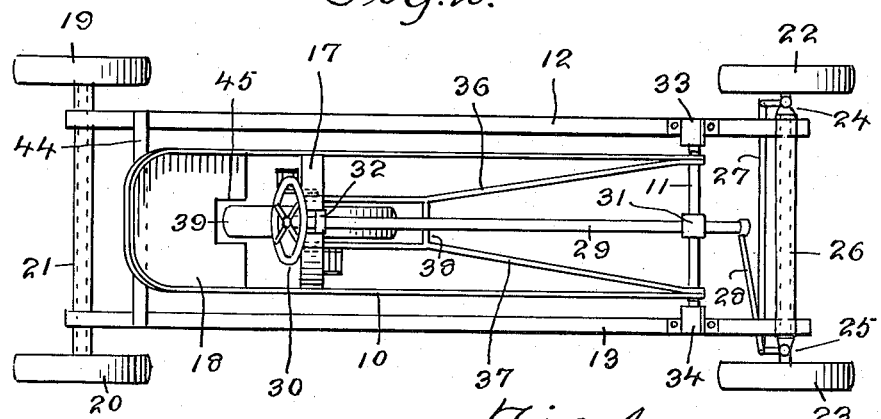
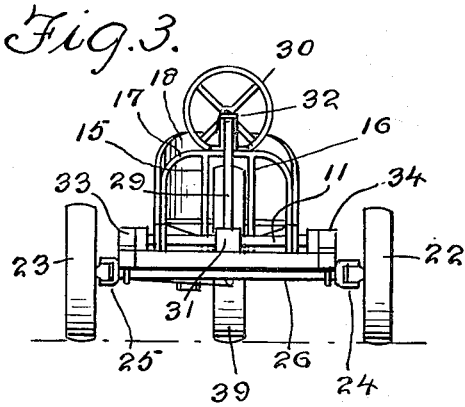
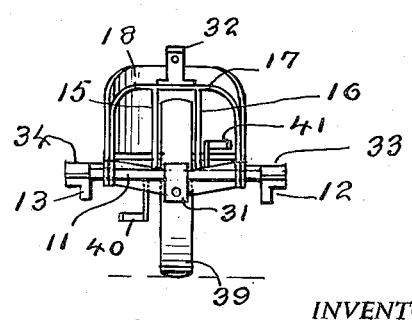
INVENTORS
Christian J. Simonson
Manley Leroy Simonson
BY Victor J. Evans & Co.
ATTORNEYS Patented Mar. 2, 1954

2,670,970

UNITED STATES PATENT OFFICE 2,670,970

TOY VEHICLE WITH SUBFRAME TRACTION WHEEL

Christian J. Simonson and Manley Leroy Simonson, Portland, Oreg.

Application August 10, 1951, Serial No. 241,178

3 Claims. (Cl. 280—259)

This invention relates to toy vehicles of the self propelled type, and in particular a vehicle having a chassis mounted on four wheels with a sub-frame in which a seat and a pedal actuated fifth wheel are positioned pivotally mounted in the forward end of the chassis and positioned whereby the fifth or driving wheel extends downwardly through the chassis.

The purpose of this invention is to provide a toy vehicle in which the weight of an occupant thereof is applied directly to a driving wheel that is mounted independently of the conventional front and rear wheels of the vehicle.

In a conventional type of toy vehicle where the weight of a child is supported on four wheels the driving wheels have very little traction and it is sometimes difficult to propel the vehicle, particularly over wet grass. With this thought in mind the invention contemplates a vehicle having a driving wheel mounted in a sub or inner frame whereby with the weight of a child positioned on a seat in the inner frame applied directly to the driving wheel the greatest possible traction is obtained.

The object of this invention is, therefore, to provide means for mounting a traction wheel in a toy vehicle whereby substantially the entire weight of an occupant of the vehicle is applied to the traction wheel.

Another object of the invention is to provide a toy vehicle in which the weight of a child therein is applied to the fifth or traction wheel wherein a seat for the child is positioned so that the traction wheel is rotated by pedals mounted on the shaft thereof.

A further object of the invention is to provide a toy vehicle having a fifth wheel mounted in a sub-frame pivotally mounted on the chassis of the vehicle, which is of a simple and economical construction.

With these and other objects and advantages in view the invention embodies a frame or chassis mounted on front and rear wheels with a steering wheel connected by a tie rod to the front wheels, and a sub-frame pivotally mounted on a shaft extended across the chassis and having a traction wheel and a seat carried by the said sub-frame whereby the weight of a child positioned in the seat is applied to the traction wheel.

Other features and advantages of the invention will appear from the following description taken in connection with the drawings wherein:

Figure 1 is a side elevational view of the improved toy vehicle.

Figure 2 is a plan view of the vehicle.

Figure 3 is a front elevational view of the vehicle showing the steering knuckles by which the front wheels are attached to the chassis.

Figure 4 is a front elevational view illustrating the sub-frame with the wheels of the chassis of the vehicle omitted.

Referring now to the drawings wherein like reference characters denote corresponding parts the improved toy vehicle of this invention includes a sub-frame formed with a U-shaped bar 10 which is pivotally mounted on a shaft 11 on side rails 12 and 13 of a chassis, a traction wheel 39 journalled by a shaft 14 in vertical bars 15 and 16 of a yoke 17, and a seat 18 that is positioned in the closed end of the frame.

The side rails 12 and 13 of the chassis of the vehicle are carried by rear wheels 19 and 20 on an axle 21 at the rear, and front wheels 22 and 23, which are connected by steering knuckles 24 and 25 to a front axle 26.

The steering knuckles are connected by a tie rod 27 to one end of a radius rod 28 by means of a universal joint. The other end of the radius rod 28 being connected by a universal joint to the lower end of a steering post 29, on the opposite end of which a steering wheel 30 is positioned. The lower end of the post 29 is carried by a bearing 31 on the shaft 11 and the upper end is journaled in a bearing 32 on the yoke 17.

The shaft 11 is rotatably mounted on the side rails 12 and 13 by bearings 33 and 34, respectively.

The yoke 17 extends upwardly from the side members of the U-shaped sub-frame 10 and the lower ends of the bars 15 and 16, which extend downwardly from the upper part of the yoke, are reinforced by braces 36 and 37 which are connected by a cross bar 38.

The shaft 14 on which the traction wheel 39 is positioned is journalled in the lower ends of the bars 15 and 16 and rearwardly extended ends of the braces 36 and 37 and the traction wheel is actuated by pedals 40 and 41 extended from the ends of the shaft 14.

The seat 18 is provided with snubbers 42 that are positioned to co-act with snubbers 43 on a cross bar 44 carried by the rails 12 and 13 of the chassis whereby downward movement of the seat and sub-frame is limited.

The seat 18 may be provided with a notch or recess 45 to provide clearance for the wheel 39.

It will be understood that modications may be made in the design and arrangement of the parts without departing from the spirit of the invention.

What is claimed is:

1. A toy vehicle comprising a chassis mounted on front and rear wheels, a pivot shaft journalled on said chassis transversely thereof, a U-shaped sub-frame positioned in said chassis and pivotally mounted on the pivot shaft, a traction wheel journalled in the sub-frame, a seat mounted in the curved portion of said U-shaped sub-frame, and pedals carried by the pivotal mounting of the traction wheel in the sub-frame for operating the said traction wheel.

2. In a toy vehicle, the combination of which comprises a chassis mounted on front and rear wheels, a pivot shaft journalled on said chassis transversely thereof, a substantially U-shaped horizontally disposed bar providing a sub-frame pivotally mounted at its ends on the pivot shaft, a U-shaped yoke extended upwardly from the sub-frame, a seat carried by the curved portion of said U-shaped sub-frame, a traction wheel positioned in the U-shaped yoke and depending from the sub-frame, a shaft having pedals on the ends journalling the traction wheel in the U-shaped yoke of the sub-frame, and a steering wheel journalled on the curved portion of the U-shaped yoke and the pivot shaft and extended upwardly from the sub-frame and connected to the front wheels of the vehicle.

3. A toy vehicle comprising a chassis mounted on front and rear wheels, a pivot shaft rotatably mounted on said chassis and positioned transversely thereof, a U-shaped sub-frame having a U-shaped yoke extending upwardly therefrom positioned in said chassis and pivotally mounted on the pivot shaft, a traction wheel having a pivotal mounting in the U-shaped yoke of the sub-frame, a seat mounted in the curved portion of said U-shaped sub-frame, pedals carried by the pivotal mounting of the traction wheel in the U-shaped yoke of the sub-frame for operating the said traction wheel, a steering wheel mounted on the curved portion of the U-shaped yoke of said U-shaped sub-frame, a bearing for said steering wheel mounted on said pivot shaft, and means connecting the steering wheel to the front wheels of the vehicle.

CHRISTIAN J. SIMONSON.
MANLEY LEROY SIMONSON.

References Cited in the file of this patent

UNITED STATES PATENTS

| Number | Name | Date |
| --- | --- | --- |
| 778,821 | Duryea | Dec. 27, 1904 |
| 1,146,880 | Jahnke | July 20, 1915 |
| 1,284,435 | Oversmith | Nov. 12, 1918 |
| 1,354,141 | Sleffel | Sept. 28, 1920 |